(12) United States Patent
Marvin

(10) Patent No.: US 9,710,911 B2
(45) Date of Patent: Jul. 18, 2017

(54) SYSTEM AND METHOD FOR GENERATING A BACKGROUND REFERENCE IMAGE FROM A SERIES OF IMAGES TO FACILITATE MOVING OBJECT IDENTIFICATION

(71) Applicant: Raytheon Company, Waltham, MA (US)

(72) Inventor: Eric D. Marvin, Rockwall, TX (US)

(73) Assignee: Raytheon Company, Waltham, MA (US)

( * ) Notice: Subject to any disclaimer, the term of this patent is extended or adjusted under 35 U.S.C. 154(b) by 88 days.

(21) Appl. No.: 14/953,820

(22) Filed: Nov. 30, 2015

(65) Prior Publication Data

US 2017/0154427 A1    Jun. 1, 2017

(51) Int. Cl.
| | |
|---|---|
| *G06K 9/00* | (2006.01) |
| *G06K 9/34* | (2006.01) |
| *G06K 9/38* | (2006.01) |
| *G06T 7/00* | (2017.01) |
| *G06T 7/20* | (2017.01) |

(52) U.S. Cl.
CPC .............. *G06T 7/0044* (2013.01); *G06T 7/20* (2013.01)

(58) Field of Classification Search
None
See application file for complete search history.

(56) References Cited

U.S. PATENT DOCUMENTS

| | | | | |
|---|---|---|---|---|
| 5,179,599 A * | 1/1993 | Formanek | ................ | G06K 9/38 382/172 |
| 5,748,775 A * | 5/1998 | Tsuchikawa | ....... | G06K 9/00369 375/E7.083 |
| 5,889,878 A * | 3/1999 | Togashi | .................. | G06T 7/136 348/222.1 |
| 5,889,885 A * | 3/1999 | Moed | ....................... | G06K 9/38 382/171 |
| 6,043,900 A * | 3/2000 | Feng | ....................... | G06T 5/009 358/1.9 |
| 6,064,762 A * | 5/2000 | Haenel | ..................... | G06K 9/38 382/171 |
| 6,195,458 B1 * | 2/2001 | Warnick | ................. | G11B 27/28 348/700 |
| 6,323,957 B1 * | 11/2001 | Ball | ........................ | H04N 1/58 358/1.9 |
| 6,674,899 B2 * | 1/2004 | Nagarajan | ............ | H04N 1/4074 358/462 |
| 6,754,367 B1 * | 6/2004 | Ito | ...................... | G06K 9/00771 348/154 |

(Continued)

*Primary Examiner* — Avinash Yentrapati
(74) *Attorney, Agent, or Firm* — Burns & Levinson LLP; Joseph M. Maraia

(57) ABSTRACT

A system for identifying pixels associated with moving objects in a series of image frames establishes a stationary pixel value for the portion of the image that is stationary, that is, the background. As the stationary background is generally visible more often than the moving objects, each of the pixel values in a sequence of frames is placed into one of three groups or bins, each bin having a respective range of values. The bin with the most pixel values placed therein represents the stationary background and the average of the pixel values in that bin is set as the background pixel value against which pixel values in subsequent frames are compared to identify the moving objects in the image.

31 Claims, 10 Drawing Sheets

(56) References Cited

U.S. PATENT DOCUMENTS

| | | | | |
|---|---|---|---|---|
| 6,785,405 B2* | 8/2004 | Tuttle | G06K 9/00442 | |
| | | | 340/5.86 | |
| 7,054,485 B2* | 5/2006 | Li | G06T 7/136 | |
| | | | 382/171 | |
| 7,668,394 B2* | 2/2010 | Ahmed | G06K 9/38 | |
| | | | 382/168 | |
| 8,594,423 B1* | 11/2013 | Carpenter | G06K 9/6212 | |
| | | | 358/453 | |
| 9,613,276 B2* | 4/2017 | Burghouts | G06K 9/00711 | |
| 2003/0031366 A1* | 2/2003 | Li | G06K 9/38 | |
| | | | 382/206 | |
| 2003/0053692 A1* | 3/2003 | Hong | G06T 7/194 | |
| | | | 382/171 | |
| 2005/0111718 A1* | 5/2005 | MacMahon | A61B 6/463 | |
| | | | 382/130 | |
| 2007/0140577 A1* | 6/2007 | Ahmed | G06K 9/38 | |
| | | | 382/254 | |
| 2008/0031493 A1* | 2/2008 | Brogren | G06K 9/00369 | |
| | | | 382/103 | |
| 2008/0063238 A1* | 3/2008 | Wiedemann | G06K 9/0063 | |
| | | | 382/103 | |
| 2008/0219505 A1* | 9/2008 | Morimitsu | G06K 9/00201 | |
| | | | 382/103 | |
| 2009/0226037 A1* | 9/2009 | Yang | G06K 9/00369 | |
| | | | 382/103 | |
| 2009/0304229 A1* | 12/2009 | Hampapur | G06K 9/00771 | |
| | | | 382/103 | |
| 2009/0324023 A1* | 12/2009 | Tian | G06K 9/00234 | |
| | | | 382/118 | |
| 2010/0111362 A1* | 5/2010 | Huang | G06K 9/4642 | |
| | | | 382/103 | |
| 2011/0158518 A1* | 6/2011 | Kang | G06K 9/4642 | |
| | | | 382/165 | |
| 2013/0202210 A1* | 8/2013 | Ryoo | G06K 9/4642 | |
| | | | 382/195 | |
| 2013/0308856 A1* | 11/2013 | Carpenter | G06K 9/00335 | |
| | | | 382/164 | |
| 2014/0126818 A1* | 5/2014 | Wei | G06T 7/215 | |
| | | | 382/171 | |
| 2015/0098648 A1* | 4/2015 | Ishii | G06T 7/0081 | |
| | | | 382/164 | |
| 2016/0004929 A1* | 1/2016 | Varghese | G06K 9/00771 | |
| | | | 382/103 | |
| 2016/0065864 A1* | 3/2016 | Guissin | G06T 5/008 | |
| | | | 348/239 | |
| 2016/0171664 A1* | 6/2016 | Komiya | G06T 5/003 | |
| | | | 382/275 | |
| 2016/0217346 A1* | 7/2016 | Puetter | G06T 5/50 | |

* cited by examiner

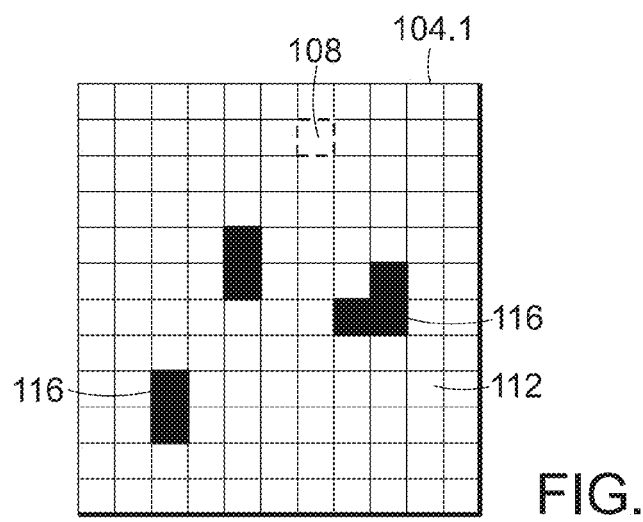
FIG. 1.1
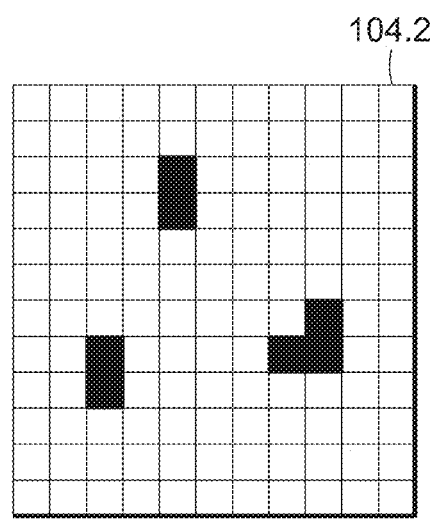
FIG. 1.2
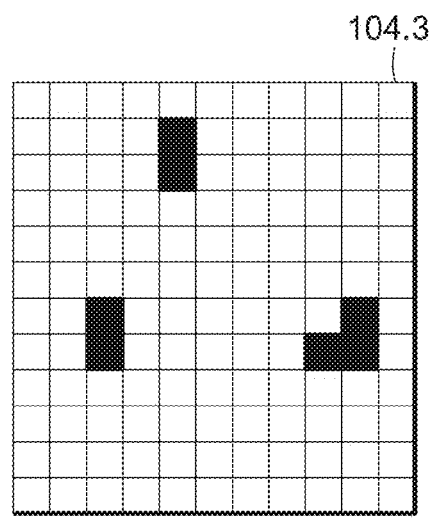
FIG. 1.3

FIG. 4.1

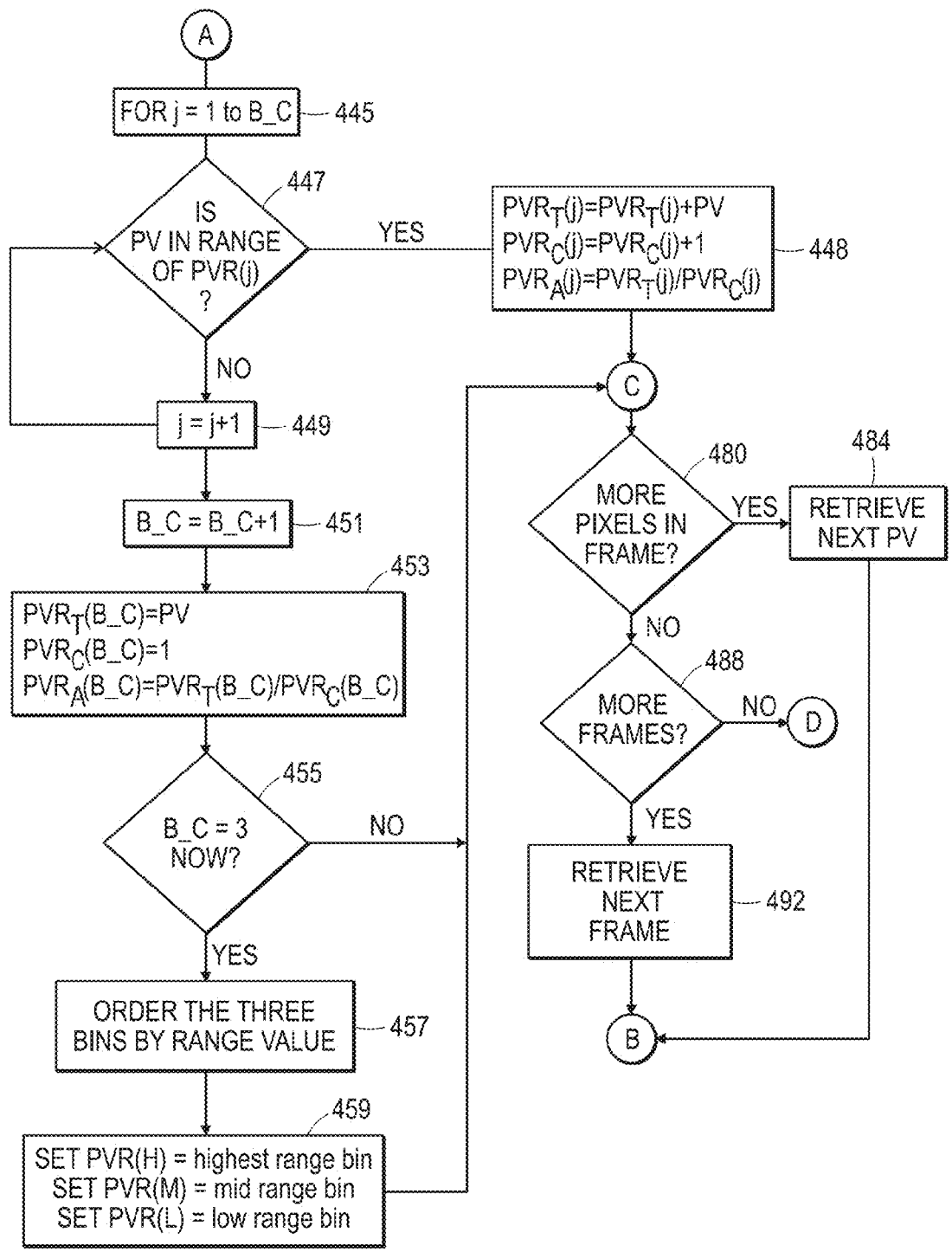
FIG. 4.2

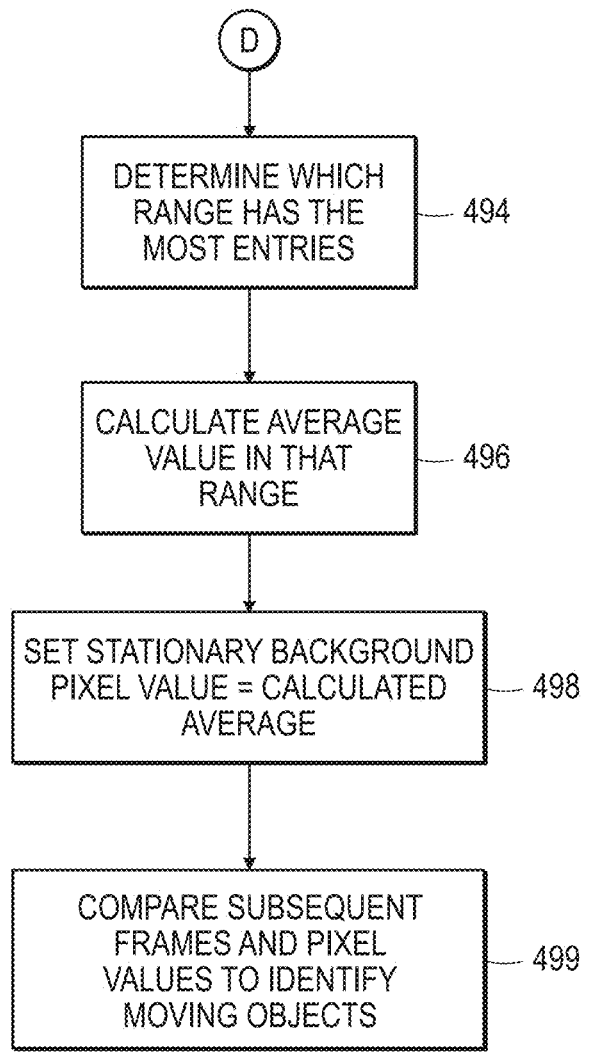
FIG. 4.3

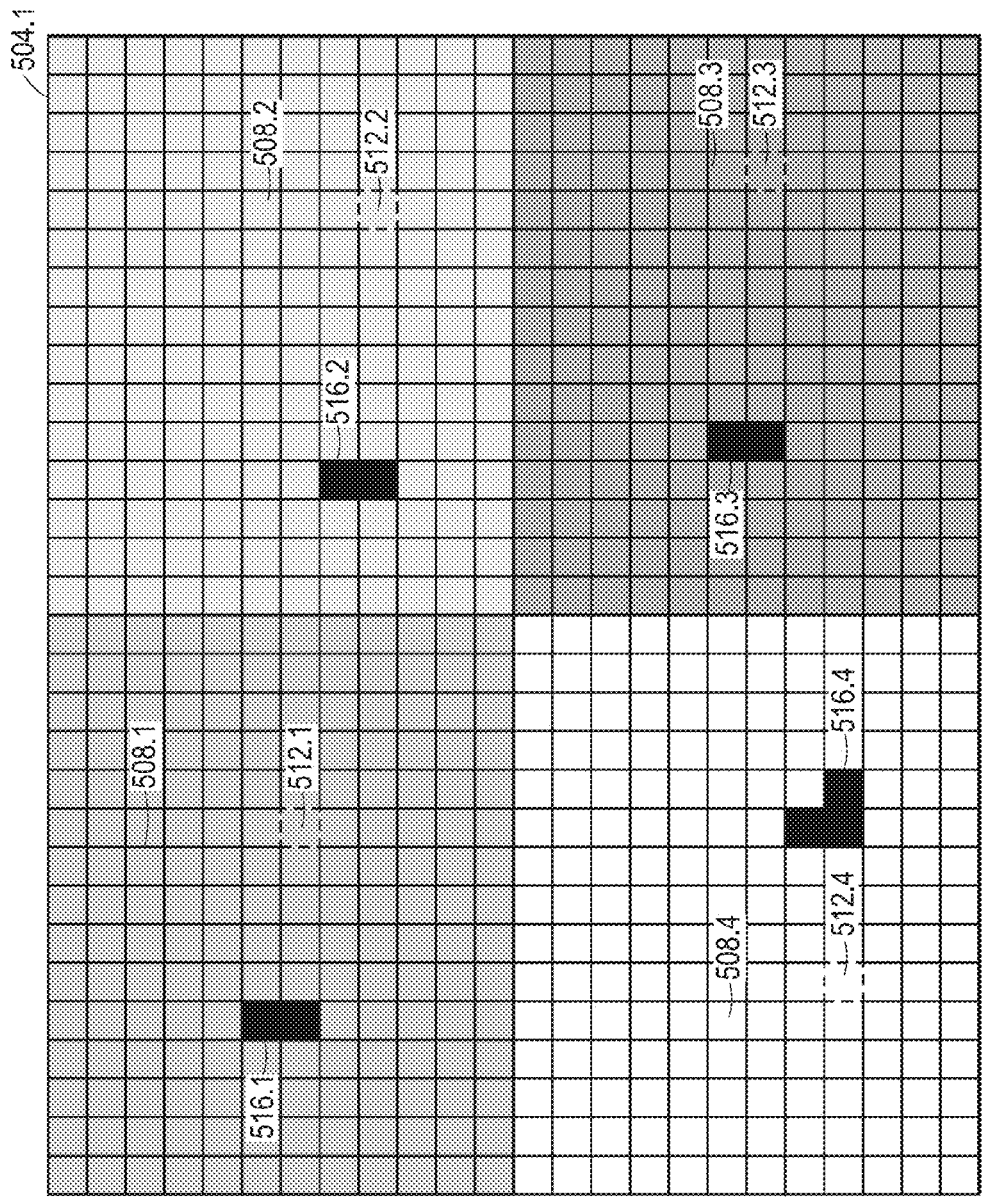
FIG. 5.1

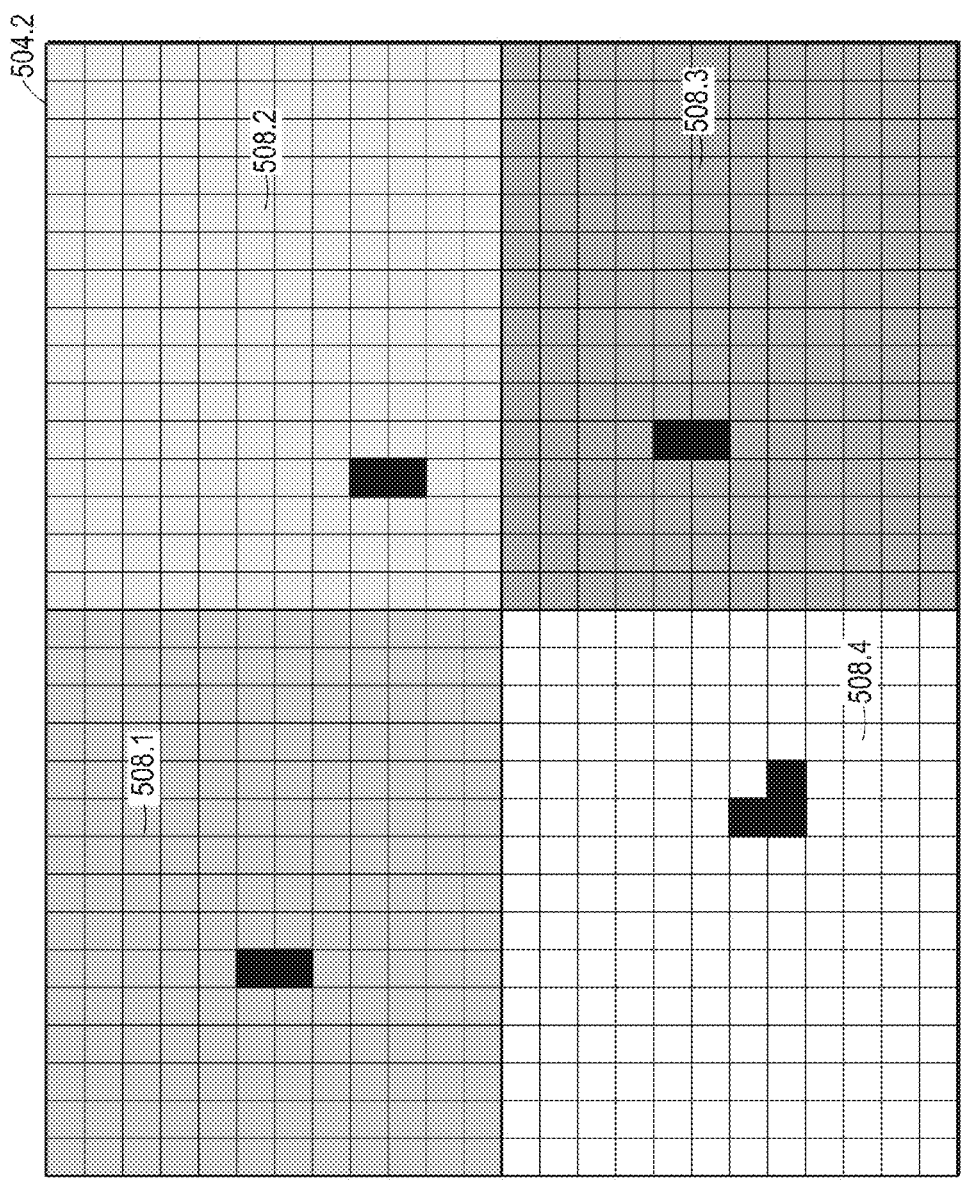
FIG. 5.2

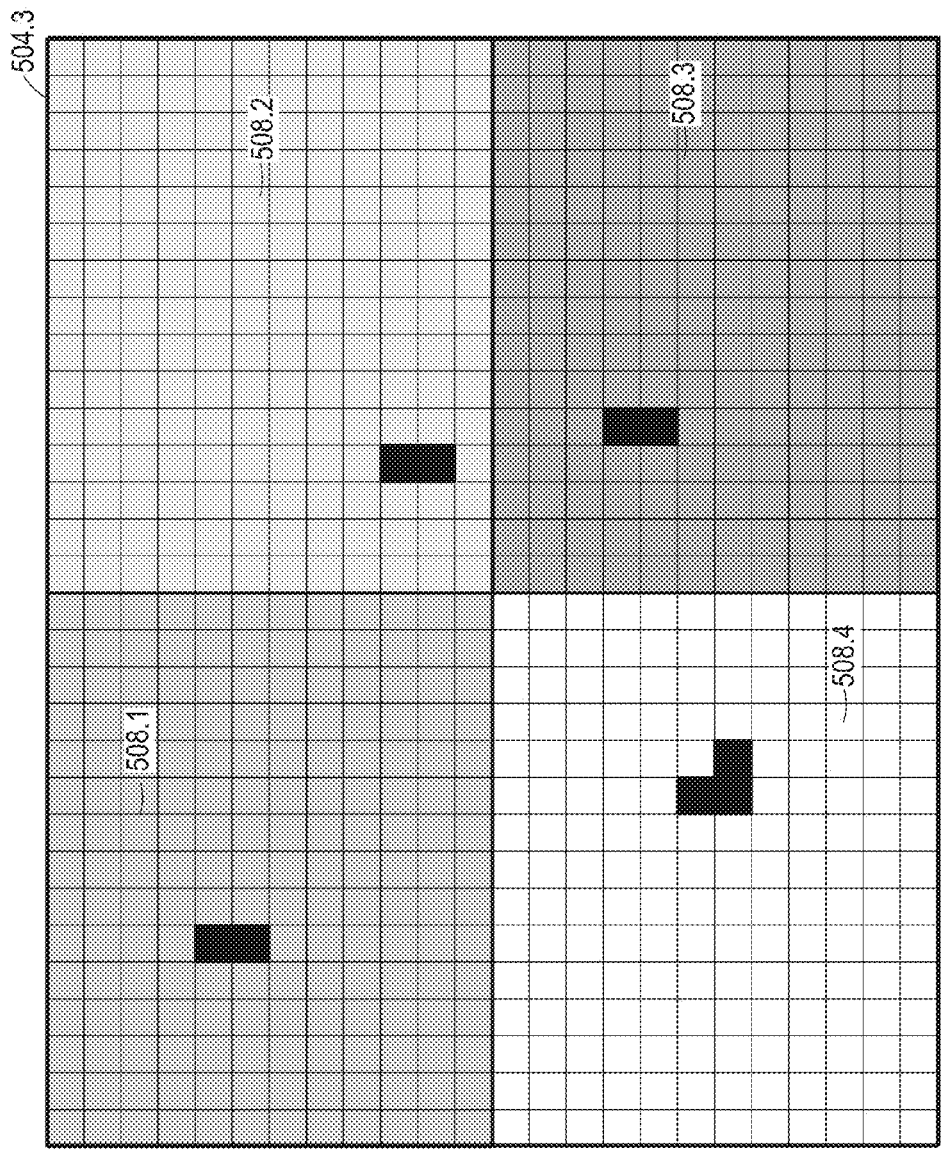
FIG. 5.3

SYSTEM AND METHOD FOR GENERATING A BACKGROUND REFERENCE IMAGE FROM A SERIES OF IMAGES TO FACILITATE MOVING OBJECT IDENTIFICATION

BACKGROUND OF THE INVENTION

Identifying moving objects in a scene, from a sequence of images, for example, a video stream, is a very important, and computation-intensive, endeavor. Generally, known approaches to identifying moving objects in pan imagery use "change detection" where an image with moving objects is differenced with, i.e., compared to, a background image that contains no moving objects. The problem is how to generate a background image from a series of images with many moving objects in close proximity to one another.

There are several different methods of creating a background image. These methods include: a) for a given frame, taking the previous frame as a background; b) averaging n previous frames to form a background; c) morphing the background by making small changes based on the previous image frame; or d) a 3-frame method using the current frame and the two previous frames.

A better method of creating a background image that can be used in change detection processing to identify multiple moving objects in close proximity is needed.

BRIEF SUMMARY OF THE INVENTION

In one embodiment of the present invention, a method of identifying a moving object with respect to a stationary portion of a sequence of image frames is implemented in a computer, where the computer comprises a processor and a memory configured to store a plurality of instructions executable by the processor to implement the method, where the method comprises initializing a plurality X of pixel value bins PVR(X), where each bin PVR(X) has an initial corresponding running total value $PVR_T(X)=0$ and an initial corresponding count of a number of entries $PVR_C(X)=0$. Subsequently, for each pixel in a first frame portion of each frame of a subset of image frames of the plurality of image frames: retrieving the corresponding pixel value PV; determining to which pixel value bin PVR(X) the retrieved pixel value PV is to be added; and adding the retrieved pixel value PV to the running total $PVR_T(X)$ of the determined pixel value bin PVR(X) and incrementing the corresponding count of the number of entries $PVR_C(X)$. Once all frames have been processed, determining which pixel value bin PVR(X) has the highest number of entries $PVR_C(X)$; determining a stationary pixel value equal to an average value $PVR_A(X)$ of the pixel value bin PVR(X) with the highest number of entries; and comparing pixel values in the first frame portion of subsequent image frames to the stationary pixel value and, if a difference therebetween is greater than a predetermined threshold value, identifying the corresponding pixel as a part of the moving object in the first frame portion of the sequence of image frames.

In another embodiment, a system comprises a processor and logic stored in one or more nontransitory, computer-readable, tangible media that are in operable communication with the processor, where the logic is configured to store a plurality of instructions that, when executed by the processor, causes the processor to implement a method of identifying a moving object with respect to a stationary portion of a sequence of image frames, where the method comprises initializing a plurality X of pixel value bins PVR(X), where each bin PVR(X) has an initial corresponding running total value $PVR_T(X)=0$ and an initial corresponding count of a number of entries $PVR_C(X)=0$. Subsequently, for each pixel in a first frame portion of each frame of a subset of image frames of the plurality of image frames: retrieving the corresponding pixel value PV; determining to which pixel value bin PVR(X) the retrieved pixel value PV is to be added; and adding the retrieved pixel value PV to the running total $PVR_T(X)$ of the determined pixel value bin PVR(X) and incrementing the corresponding count of the number of entries $PVR_C(X)$. Once all frames have been processed, determining which pixel value bin PVR(X) has the highest number of entries $PVR_C(X)$; determining a stationary pixel value equal to an average value $PVR_A(X)$ of the pixel value bin PVR(X) with the highest number of entries; and comparing pixel values in the first frame portion of subsequent image frames to the stationary pixel value and, if a difference therebetween is greater than a predetermined threshold value, identifying the corresponding pixel as a part of the moving object in the first frame portion of the sequence of image frames.

In another embodiment, a non-transitory computer readable media comprising instructions stored thereon that, when executed by a processing apparatus, cause the processing apparatus to implement a method of identifying a moving object with respect to a stationary portion of a sequence of image frames comprising initializing a plurality X of pixel value bins PVR(X), where each bin PVR(X) has an initial corresponding running total value $PVR_T(X)=0$ and an initial corresponding count of a number of entries $PVR_C(X)=0$. Subsequently, for each pixel in a first frame portion of each frame of a subset of image frames of the plurality of image frames: retrieving the corresponding pixel value PV; determining to which pixel value bin PVR(X) the retrieved pixel value PV is to be added; and adding the retrieved pixel value PV to the running total $PVR_T(X)$ of the determined pixel value bin PVR(X) and incrementing the corresponding count of the number of entries $PVR_C(X)$. Once all frames have been processed, determining which pixel value bin PVR(X) has the highest number of entries $PVR_C(X)$; determining a stationary pixel value equal to an average value $PVR_A(X)$ of the pixel value bin PVR(X) with the highest number of entries; and comparing pixel values in the first frame portion of subsequent image frames to the stationary pixel value and, if a difference therebetween is greater than a predetermined threshold value, identifying the corresponding pixel as a part of the moving object in the first frame portion of the sequence of image frames.

In one embodiment, the method includes setting the predetermined threshold value as a function of a maximum pixel value and a minimum pixel value in the pixel value bin with the highest number of entries.

In another embodiment, setting the predetermined threshold value further comprises determining a maximum pixel value in the pixel value bin with the highest number of entries; determining a minimum pixel value in the pixel value bin with the highest number of entries; determining a first difference between the stationary pixel value and the maximum pixel value; determining a second difference between the stationary pixel value and the minimum pixel value; and setting the predetermined threshold value to a lesser of the first and second differences.

In another embodiment, the method includes calculating a running average PVRA(M) PVRT(M)/PVRC(M); and setting the range RM of PVR(M) to (PVRA(M)±W/2).

In another embodiment, defining each bin PVR(X) further comprises determining if a number (j) of bins PVR(X) that have been populated with at least one entry is less than X, then comparing the retrieved pixel value PV to the ranges of the populated bins PVR(j) and creating a new bin PVR(j+1) if the retrieved pixel value PV is not within a range of an already populated bin PVR(j).

BRIEF DESCRIPTION OF THE DRAWINGS

Various aspects of at least one embodiment of the present invention are discussed below with reference to the accompanying figures. It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. For purposes of clarity, not every component may be labeled in every drawing. The figures are provided for the purposes of illustration and explanation and are not intended as a definition of the limits of the invention. In the figures:

FIGS. 1.1-1.3 are representations of sequential image frames being processed in accordance with an embodiment of the present invention;

FIGS. 5.1-5.3 are representations of sequential image frames being processed in accordance with another embodiment of the present invention.

DETAILED DESCRIPTION

Figure 2:
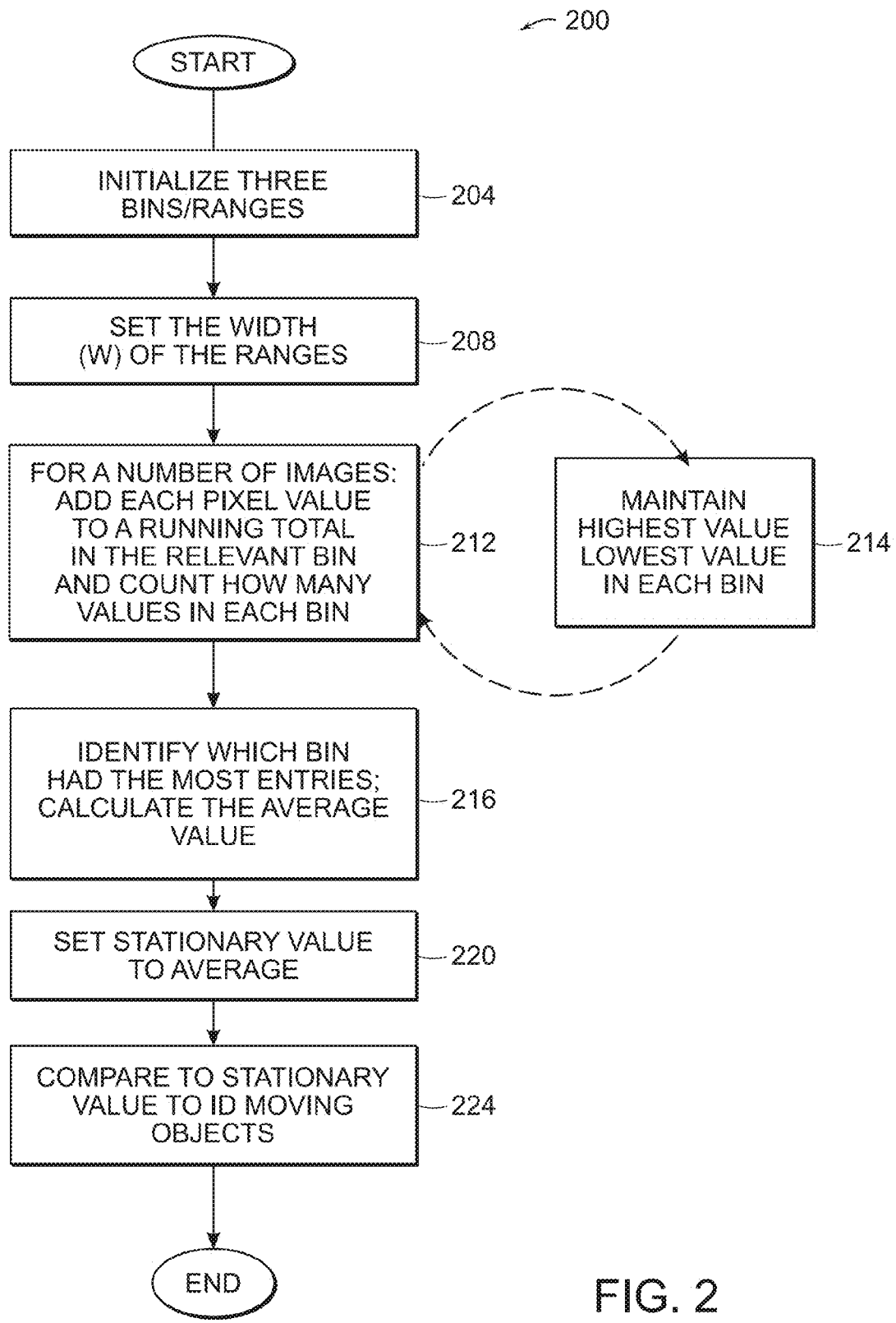
FIG. 2 is a flowchart of a method in accordance with an embodiment of the present invention.

In the following detailed description, numerous specific details are set forth in order to provide a thorough understanding of the embodiments of the present invention. It will be understood by those of ordinary skill in the art that these embodiments of the present invention may be practiced without some of these specific details. In other instances, well-known methods, procedures, components and structures may not have been described in detail so as not to obscure the embodiments of the present invention.

Prior to explaining at least one embodiment of the present invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein are for the purpose of description only and should not be regarded as limiting.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Generally, the process of identifying or detecting moving object is performed over video data, i.e., a sequence of image frames that have been co-registered. This video data may be received by image capturing devices and, prior to manipulation in accordance with embodiments of the present invention, image processing techniques, e.g., pixel processing, gain correction, etc., may be implemented to condition the video data. The image frames may be acquired at a fixed rate, e.g., 60 Hz or 120 Hz. Each frame is composed of a plurality of pixels in an array, e.g., 1024×1024; 2048× 2048 or 2048×1024. Each pixel has an intensity value corresponding to the intensity of the image at the pixel location. The image frames can be grayscale, color, or any other representation of the electromagnetic spectrum, e.g., infrared, near infrared, x-ray, etc., that the specific imaging sensor is able to acquire.

It has been observed that a stationary background is visible more often than the moving objects in the sequence of image frames. Accordingly, as will be discussed in more detail below, a respective pixel value for each pixel in a sequence of frames is placed into, i.e., added to, one of three bins or groups of values, for example, but not limited to, a low, a middle or a high bin. More specifically, a running accumulated total value is maintained for each group along with a respective number of entries that contributed to the running value. In other words, a histogram of the pixel values of those frames is created. Once all of the pixels of either a predetermined or sufficient number of frames have been processed, the bin with the most entries is determined to represent the stationary background. The stationary pixel value is the average value in that bin, i.e., the accumulated value divided by the number of entries. The histogram can be performed on a fixed, i.e., predetermined, number of frames or as a running total over all the frames.

Referring now to FIGS. 1.1-1.3, a plurality of sequential image frames 104.1-104.3 is presented. These frames can be considered as sequential in time and include a plurality of pixels 108 (shown in dotted line) as is known to those of ordinary skill in the art. As above, it has been observed that the stationary background is visible more often than the moving objects in a given image frame. Merely for exemplary purposes, the background pixels 112 are represented as a light gray portion whereas those pixels 116 corresponding to components that are not a portion of the background are presented as having a different gradient and are likely related to moving objects.

As the sequence of images proceeds from image 104.1 through 104.3, those pixels 116 associated with moving objects are changing positions considering that each of the frames 104.1-104.3 are co-registered with one another.

Advantageously, embodiments of the present invention provide for distinguishing the pixels, and their values, of the stationary background from the pixels that represent objects moving with respect to that stationary background. More particularly, in one embodiment of the present invention, a method 200, as shown in FIG. 2, initializes three bins to have zero entries and an accumulated value that is also zero, step 204, to be used to identify the background pixels.

Merely for purposes of explanation, three bins have been defined and labeled L, M and H. These bins are defined such that the range of the M bin is between the ranges of the L and H bins, i.e., Low, Middle and High. In addition, for purposes of nomenclature as used in this specification, the pixel value ranges or "bins" L, M, H are referred to as PVR(L), PVR(M) and PVR(H), respectively, with corresponding running total values $PVR_T(L)$, $PVR_T(M)$ and $PVR_T(H)$; corresponding numbers of entries $PVR_C(L)$, $PVR_C(M)$ and $PVR_C(H)$; and corresponding average values $PVR_A(L)$, $PVR_A(M)$ and $PVR_A(H)$, as will be explained below in more detail.

Figure 3:
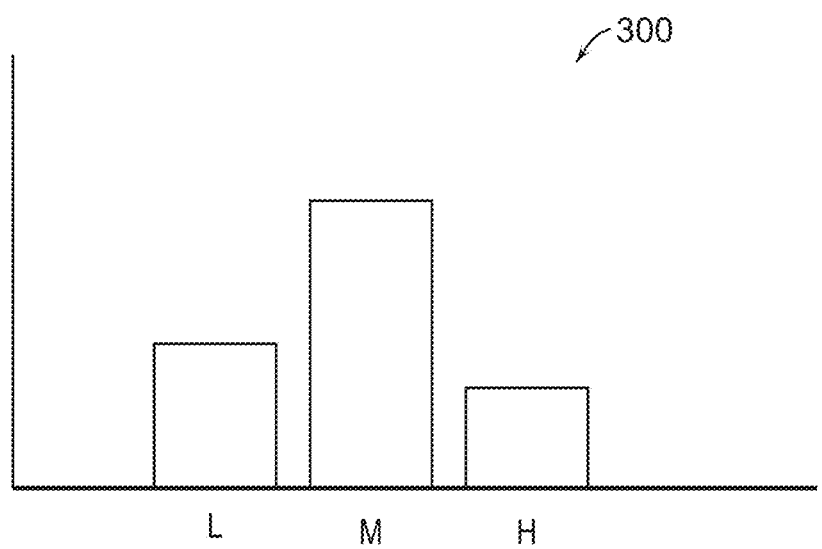
FIG. 3 is a histogram of pixel values.

In step 208, a width (W) for each of the bins is determined. A bin may have an average value $P_A$ where a range R of a bin is $(P_A-W_1) \leq R \leq (P_A+W_2)$, where $W_1+W_2=W$. In one embodiment, $W_1=W_2$. As has been referenced above, and which will be described in more detail below, each of these bins is being established to receive, i.e., accumulate, pixel values in respective ranges. A determination is made as to which bin the pixel value is added. When the determination is made, the pixel value is added to the running total for that bin; the count of the number of items that have been added is incremented by one; and the average value for the bin is recalculated, step 212. It should be noted that the average value for each of the bins may not need to be calculated as entries are added. Once all of the pixels and their respective pixel values in the predetermined number of image frames have been assigned to a bin, a histogram 300, as shown in FIG. 3 has been obtained.

After all of the pixels in the predetermined number of frames have been processed, at step 216 it is determined which of the bins has the most entries. The average value of the entries in that bin is then determined to be the stationary pixel value, step 220.

In order to identify the moving objects, step 224, each pixel value is compared to the stationary pixel value and if it differs by more than a predetermined threshold value, that pixel is determined to be representative of a moving object in the image.

Figure 4:
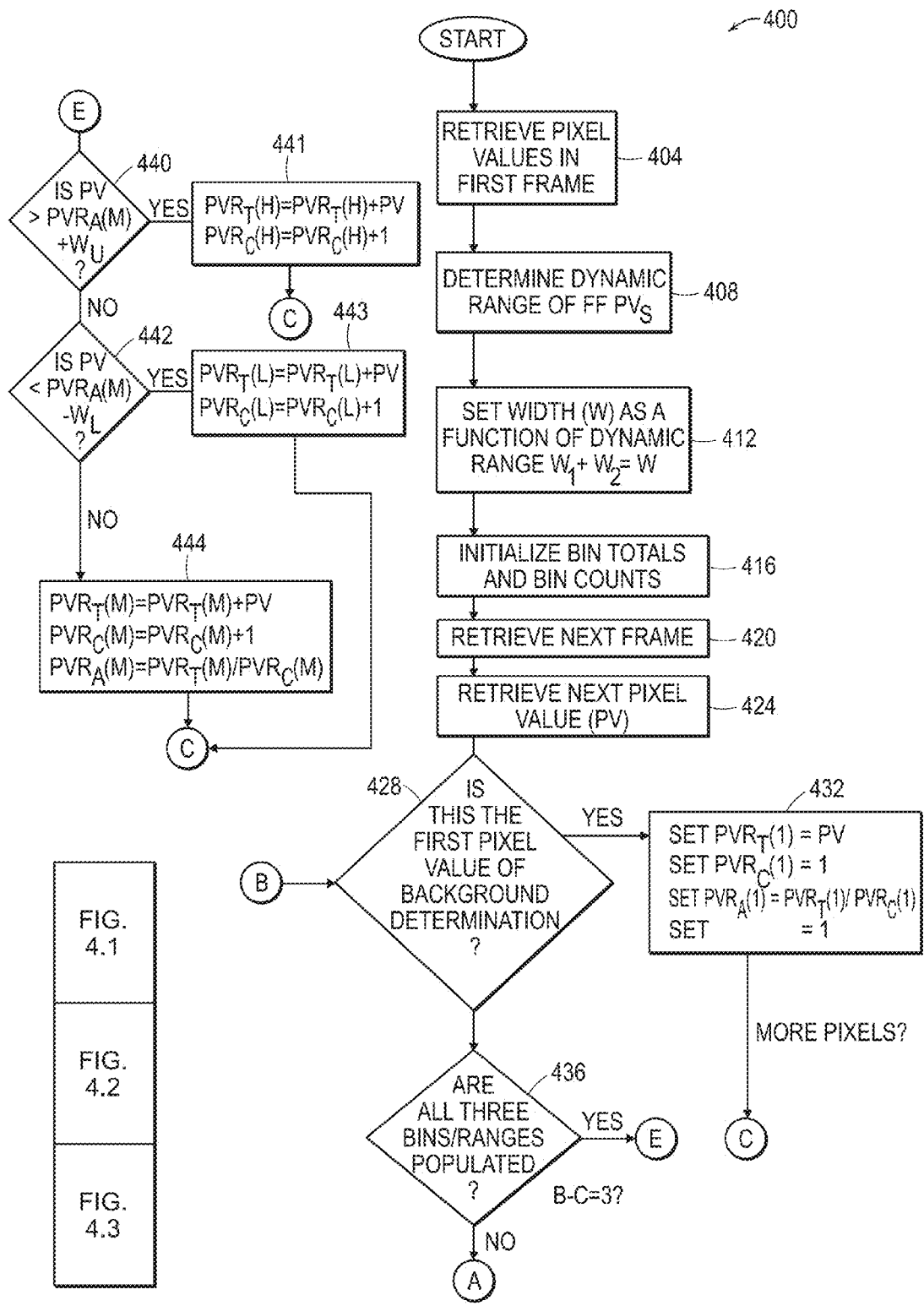
FIGS. 4 and 4.1-4.3 is a flowchart of a method in accordance with an embodiment of the present invention.

Referring now to FIGS. 4 and 4.1-4.3, a method 400 in accordance with an embodiment of the present invention will be described. Initially, step 404, the pixel values in a first frame are retrieved. Subsequently, step 408, a dynamic range of the pixel values in the first frame is determined. The width (W) of the ranges or bins is then set as a function of the determined dynamic range.

More specifically, to define the width (W), a histogram of the pixel values in the frame is created. The lower x % and the upper y % of the histogram pixel values are then discarded. From the remaining histogram pixel values, the minimum and maximum pixel values, (max.pix.val, min.pix.val, respectively) are identified and:

$$W = \frac{(\text{max. pix. val} - \text{min. pix. val})}{N}$$

where N, x % and y % are predetermined depending on characteristics of the image, e.g., night/day, land/water, geographic location (GPS coordinates), date, weather conditions, infrared, ultraviolet, image capture equipment type or model, etc.

Initially, the respective range of each of the three bins PVR(L), PVR(M) and PVR(H), is unknown but will be defined by processing a number of pixels. Therefore, three "placeholder" bins, PVR(1), PVR(2) and PVR(3), and similar values as set forth above, in step 416, are initialized to have zero entries; zero accumulated value and no average value. In step 420, the next frame is retrieved and, step 424, the next pixel value (PV) is retrieved. In step 428 a determination is made as to whether or not this is the first pixel value being evaluated for background determination, i.e., for determining the background pixel value. If so, control passes to step 432 where $PVR_T(1)=PVR_T(1)+PV$ and $PVR_C(1)=PVR_C(1)+1$ and $PVR_A(1)=PVR_T(1)/PVR_C(1)$. In addition, a variable B_C that counts the number of bins that have been populated is set such that B_C=1. Control then passes to step 480 where it is determined whether or not there are more pixels in the frame. If so, control passes to step 484 to retrieve the next pixel value and then back to step 428.

Returning now to step 428, if it is determined that it is not the first pixel, control passes to step 436 where it is determined whether or not all three bins have been populated with it least one value, i.e., whether B_C=3.

At step 436, if all three bins have not been populated, i.e., B_C≠3, control passes to step 445 where a loop having a variable j=1 to B_C is entered. At step 447, it is determined whether or not the pixel value is in the PVR(j) range, i.e., is $(PVR_A(j)-WL) \leq PV \leq (PVR_A(j)+WU)$, where WU+WL=W. If it is in the range, control passes to step 448 where $PVR_T(j)=PVR_T(j)+PV$ and the count $PVR_C(j)=PVR_C(j)+1$ and $PVR_A(j)=PVR_T(j)/PVR_C(j)$, after which control passes to step 480.

Returning now to step 447, if the pixel value is not in the range of the PVR(j) bin, j=j+1, step 449, and if j≤B_C then control passes back to step 447 to determine if the pixel value is in the range of the next bin PVR(j) as above. If not, i.e., j>B_C, then control passes to step 451 where the bin count B_C is incremented, i.e., B_C=B_C+1. Subsequently, step 453, another bin is created, where $PVR_T(B\_C)=PV$ and the count $PVR_C(B\_C)=1$ and $PVR_A(B\_C)=PVR_T(B\_C)/PVR_C(B\_C)$.

It should be noted that the range of values in PVR(B_C) will change as entries are added because the average $PVR_A$ will change however the width W will remain the same.

At step 455, it is determined whether or not the bin count B_C=3, i.e., whether or not all bins have been populated. If not, control passes to step 480.

If all three bins have been populated, control pass to step 457 where the three bins PVR(1), PVR(2) and PVR(3) are analyzed to determine which bin has the highest range, which has the lowest range and which is between the highest and lowest ranges. These bins are then relabeled as PVR(H), PVR(L) and PVR(M), respectively, step 459, after which control passes to step 480.

Returning now to step 436, if it is determined that all three bins have at least one entry, i.e., the PVR(H), PVR(L) and PVR(M) bins have been identified, control passes to step 440 where it is determined if the pixel value PV is greater than the PVR(M) range and, if so, control passes to step 441 where $PVR_T(H)=PVR_T(H)+PV$, the count $PVR_C(H)=PVR_C(H)+1$ and $PVR_A(H)=PVR_T(H)/PVR_C(H)$ and then to step 480. Returning to step 440, if PV is not greater than the range of PVR(M), control passes to step 442 to determine if PV is less than the range of PVR(M). If so, control passes to step 443 and $PVR_T(L)=PVR_T(L)+PV$; $PVR_C(L)=PVR_C(L)+1$ and $PVR_A(L)=PVR_T(L)/PVR_C(L)$ and then to step 480. If, at step 442, PV is not less than the range of PVR(M), control passes to step 444 where $PVR_T(M)=PVR_T(M)+PV$; the count $PVR_C(M)=PVR_C(M)+1$; and $PVR_A(M)=PVR_T(M)/PVR_C(M)$ and control passes to step 480.

Subsequently, if it is determined at step 480 that there are no more pixels in the frame to be processed control passes to step 488 where it is determined whether or not there are more frames to process. If there are additional frames to process, control passes to step 492 where the next frame is retrieved and subsequently control passes to step 484 for processing as has been described above.

If it is determined at step 488 that there are no more frames to process, control passes to step 494 where it is determined which bin has the most entries. Subsequently, step 496, the average value in the bin with the most entries is calculated or retrieved and, step 498, the stationary background pixel value is set to that calculated average value.

In step 499 subsequent image frames and the pixel values are compared to the stationary background pixel value and if the difference is greater than a predetermined threshold value than that pixel is identified as being associated with a moving object in the image.

In one embodiment of the present invention, the predetermined threshold value for identifying a pixel value that corresponds to a moving object is determined as a function of the values in the bin with the most entries. Referring to the method 200 in FIG. 2, at step 214 the highest value and the lowest value in each bin is maintained. In order to determine the predetermined threshold value, a first difference between the highest value and the stationary background pixel value is calculated and a second difference between the lowest value and the stationary background pixel value is also calculated. The lower of the first and second differences is then chosen as the predetermined threshold value.

It will be noted that once the three bins PVR(H), PVR(L) and PVR(M) have been identified, the determination as to which bin a pixel value is placed is determined by only comparing the value to the PVR(M) range. As above, if higher than that range, it is added to the PVR(H) bin and if lower, it is added to the PVR(L) bin, otherwise it is added to the PVR(M) bin. Further, it should also be noted that the values in the range for PVR(M) may shift as the range is based on $PVR_A(M)$ which is a function of the number of entries and the accumulated value in the bin.

As set forth above, in one embodiment, the width W of the bins is set as a function of the dynamic range of the first image in the plurality of images. In an alternate embodiment, the width is set to a predetermined value as a function of a chosen characteristic of the sequence of image frames. In one example, the characteristic of the sequence of images is one of: a location represented in the sequence of images; a time of day the sequence of images was recorded; weather conditions at the location represented in the sequence of images; or a type of equipment on which the sequence of images was recorded.

In the foregoing description of one embodiment of the present invention, as per FIGS. 1.1-1.3, all of the pixels in each frame were processed to determine a stationary pixel value for the frame. In an alternate embodiment of the present invention, the frames may be divided into grids or sub-frames and each processed separately to determine respective width values (W) and stationary pixel values. This is advantageous where, for example, one section of the image is in sunlight and another portion is in shadow or one portion is water and an adjacent portion is land.

As shown in FIGS. 5.1-5.3, a plurality of sequential image frames 504.1-504.3 is presented. Similar to the description above, these frames are sequential in time and include a plurality of pixels. As above, the stationary background is visible more often than the moving objects in a given image frame. In FIGS. 5.1-5.3, however, each frame has areas with different stationary backgrounds. Accordingly, the frame 504 has been divided into four grids 508.1-508.4 with respective background pixels 512.1-512.4. Similar to the description above, pixels 516 correspond to components that are not a portion of the background and could be related to moving objects. As the sequence of images proceeds from image 504.1 through 504.3, those pixels 516 associated with moving objects are changing positions considering that each of the frames 504.1-504.3 are co-registered with one another.

Advantageously, embodiments of the present invention provide for distinguishing the pixels, and their values, of the stationary background from the pixels that represent objects moving with respect to that stationary background in each grid 508. More particularly, the above-described methods, referred to in FIGS. 2-4.3, are implemented on each grid or sub-frame 508. Accordingly, for example, a width (W) is defined, as above, the first grid 508.1 and then the "three-bin" histogram method is applied to the pixels in the grid 508.1 for a number of frames to determine the stationary pixel value for that grid. After which, the pixels in the grid 508.1 of subsequent frames are compared to the stationary pixel value to identify pixels corresponding to non-stationary objects in the grid. The foregoing would be repeated for each of the other grids.

Accordingly, application of the foregoing method to a frame includes application to either all of the pixels in the frame or some sub-set of the pixels.

Further, while the foregoing example shows grids that are rectangular, embodiments of the present invention are not limited to rectangles or squares. The grids or sub-frames could be of any shape and may include "tracing" or "free-hand" selection of pixels in the image, as is known to those of skill in the art, to process a particular portion of the image such as, for example, a roadway, rather than an empty field adjacent to the roadway.

Figure 6:
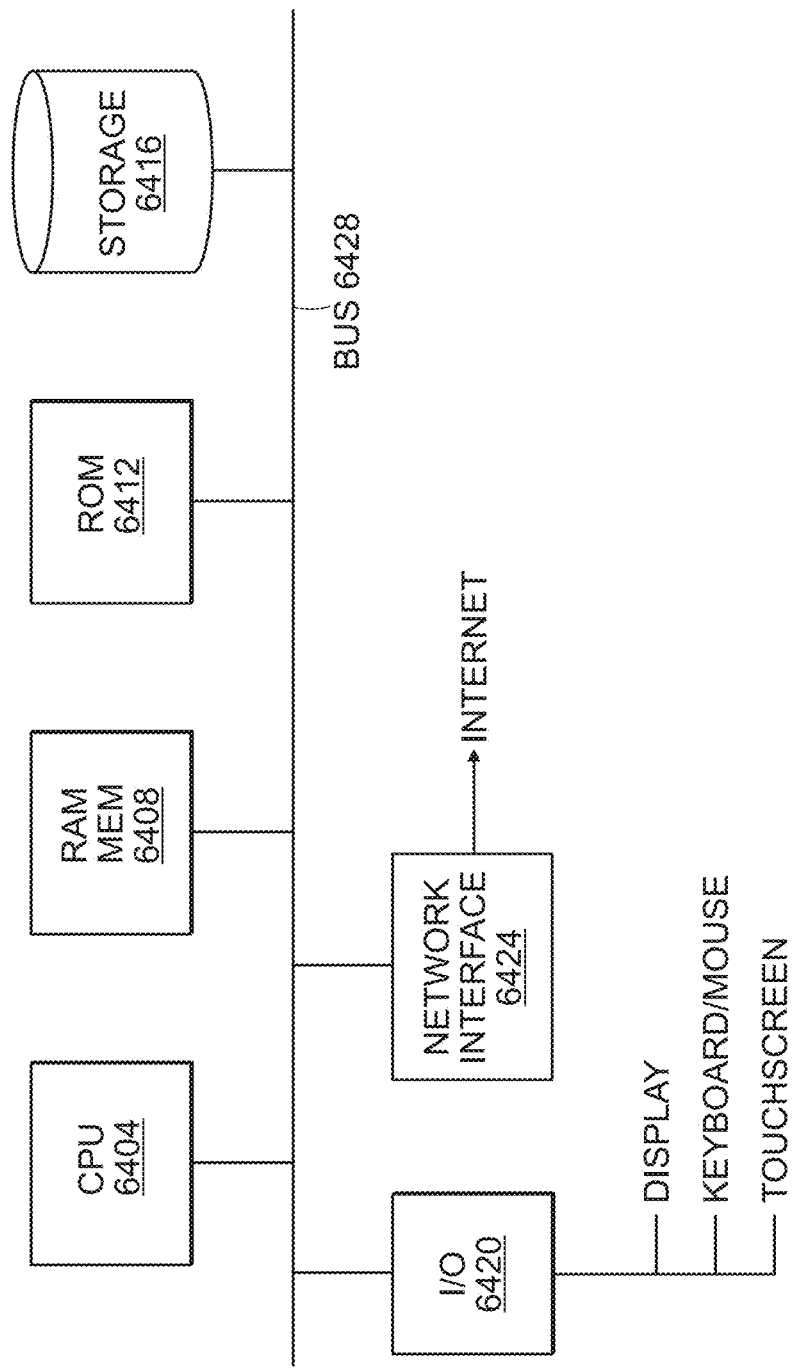
FIG. 6 is a block diagram of a system in accordance with one embodiment of the present invention.

Referring to FIG. 6, embodiments of the present invention may be implemented on a system that may comprise a CPU 6404, RAM 6408, ROM 6412, a mass storage device 6416, for example, a disk drive, an I/O interface 6420 to couple to, for example, display, keyboard/mouse or touchscreen, or the like and a network interface module 6424 to connect to, either wirelessly or via a wired connection, to the Internet. All of these modules are in communication with each other through a bus 6428. The CPU 6404 executes an operating system to operate and communicate with these various components.

Various embodiments of the above-described systems and methods may be implemented in digital electronic circuitry, in computer hardware, firmware, and/or software. The implementation can be as a computer program product, i.e., a computer program embodied in a tangible information carrier. The implementation can, for example, be in a machine-readable storage device to control the operation of data processing apparatus. The implementation can, for example, be a programmable processor, a computer and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

While the above-described embodiments generally depict a computer implemented system employing at least one processor executing program steps out of at least one memory to obtain the functions herein described, it should be recognized that the presently described methods may be implemented via the use of software, firmware or alternatively, implemented as a dedicated hardware solution such as in a field programmable gate array (FPGA) or an application specific integrated circuit (ASIC) or via any other custom hardware implementation.

It is to be understood that the present invention has been described using non-limiting detailed descriptions of embodiments thereof that are provided by way of example only and are not intended to limit the scope of the invention.

Features and/or steps described with respect to one embodiment may be used with other embodiments and not all embodiments of the invention have all of the features and/or steps shown in a particular figure or described with respect to one of the embodiments. Variations of embodiments described will occur to persons of skill in the art.

It should be noted that some of the above described embodiments include structure, acts or details of structures and acts that may not be essential to the invention and which are described as examples. Structure and/or acts described herein are replaceable by equivalents that perform the same function, even if the structure or acts are different, as known in the art, e.g., the use of multiple dedicated devices to carry out at least some of the functions described as being carried out by the processor of the present invention. Therefore, the scope of the invention is limited only by the elements and limitations as used in the claims.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

The invention claimed is:

1. A method, implemented in a computer, of identifying a moving object with respect to a stationary portion of a sequence of image frames, the computer comprising a processor and a memory configured to store a plurality of instructions executable by the processor to implement the method, the method comprising:
    initializing a plurality X of pixel value bins PVR(X), each bin PVR(X) having an initial corresponding running total value $PVR_T(X)=0$ and an initial corresponding count of a number of entries $PVR_C(X)=0$; and
    for each pixel in a first frame portion of each frame of a subset of image frames of the plurality of image frames:
        retrieving the corresponding pixel value PV;
        determining to which pixel value bin PVR(X) the retrieved pixel value PV is to be added; and
        adding the retrieved pixel value PV to the running total $PVR_T(X)$ of the determined pixel value bin PVR(X) and incrementing the corresponding count of the number of entries $PVR_C(X)$ in the corresponding bin;
    determining which pixel value bin PVR(X) has the highest number of entries $PVR_C(X)$;
    determining a stationary pixel value equal to the average value $PVR_A(X)$ of the pixel value bin PVR(X) with the highest number of entries; and
    comparing pixel values in the first frame portion of subsequent image frames to the determined stationary pixel value and, if a difference therebetween is greater than a predetermined threshold value, identifying the corresponding pixel as a part of the moving object in the first frame portion of the sequence of image frames.

2. The method of claim 1, further comprising:
    setting the predetermined threshold value as a function of a maximum pixel value and a minimum pixel value in the pixel value bin with the highest number of entries.

3. The method of claim 2, wherein setting the predetermined threshold value further comprises:
    determining a maximum pixel value in the pixel value bin with the highest number of entries;
    determining a minimum pixel value in the pixel value bin with the highest number of entries;
    determining a first difference between the stationary pixel value and the maximum pixel value;
    determining a second difference between the stationary pixel value and the minimum pixel value; and
    setting the predetermined threshold value to a lesser of the first and second differences.

4. The method of claim 1, further comprising:
    setting X=3; and
    defining pixel value bins PVR(L), PVR(M) and PVR(H), each having a same width W, wherein a range RL of bin PVR(L)<a range RM of bin PVR(M)<a range RH of bin PVR(H),
    wherein determining to which pixel value bin PVR(L), PVR(M) and PVR(H) the retrieved pixel value is to be added further comprises:
        if the pixel value PV is in the range RM of the bin PVR(M) then setting $PVR_T(M)=PVR_T(M)+PV$ and setting the count $PVR_C(M)=PVR_C(M)+1$;
        if the pixel value PV is greater than the range RM of the bin PVR(M) then setting $PVR_T(H)=PVR_T(H)+PV$ and setting the count $PVR_C(H)=PVR_C(H)+1$; and
        if the pixel value PV is less than the range RM of the bin PVR(M) then setting $PVR_T(L)=PVR_T(L)+PV$ and setting $PVR_C(L)=PVR_C(L)+1$.

5. The method of claim 4, further comprising:
    calculating an average value $PVR_A(M)=PVR_T(M)/PVR_C(M)$; and
    setting the range RM of the bin PVR(M) such that $(PVR_A(M)-WL) \le RM \le (PVR_A(M)+WU)$,
    wherein WU+WL=W.

6. The method of claim 4, further comprising:
    calculating a running average $PVR_A(M)=PVR_T(M)/PVR_C(M)$; and
    setting the range RM of PVR(M) to $(PVR_A(M) \pm W/2)$.

7. The method of claim 1, further comprising:
    setting a same width W for each pixel value bin PVR as a function of a chosen characteristic of the first frame portion of the sequence of image frames.

8. The method of claim 7, further comprising choosing the characteristic of the sequence of images from:
    a wavelength of light recorded in the sequence of images;
    a geographic location represented in the first frame portion of the sequence of images;
    a time of day the sequence of images was recorded;
    a date on which the sequence of images was recorded;
    weather conditions at the location represented in the sequence of images; and
    a type of equipment on which the sequence of images was recorded.

9. The method of claim 1, further comprising:
    determining a dynamic range of the pixel values in the first frame portion of a first image frame of the sequence of images; and
    setting a same width W for each pixel value bin PVR as a function of the determined dynamic range.

10. The method of claim 1, further comprising:
defining each bin PVR(X) having a respective range of values RV(X) wherein the ranges of values do not overlap.

11. The method of claim 10, wherein defining each bin PVR(X) further comprises:
if a number (j) of bins PVR(X) that have been populated with at least one entry is less than X, then comparing the retrieved pixel value PV to the ranges of the populated bins PVR(j) and creating a new bin PVR(j+1) if the retrieved pixel value PV is not within a range of an already populated bin PVR(j).

12. A system comprising a processor and logic stored in one or more nontransitory, computer-readable, tangible media that are in operable communication with the processor, the logic configured to store a plurality of instructions that, when executed by the processor, causes the processor to implement a method of identifying a moving object with respect to a stationary portion of a sequence of image frames, the method comprising:
initializing a plurality X of pixel value bins PVR(X), each bin PVR(X) having an initial corresponding running total value $PVR_T(X)=0$ and an initial corresponding count of a number of entries $PVR_C(X)=0$; and
for each pixel in a first frame portion of each frame of a subset of image frames of the plurality of image frames:
retrieving the corresponding pixel value PV;
determining to which pixel value bin PVR(X) the retrieved pixel value PV is to be added; and
adding the retrieved pixel value PV to the running total $PVR_T(X)$ of the determined pixel value bin PVR(X) and incrementing the corresponding count of the number of entries $PVR_C(X)$ in the corresponding bin;
determining which pixel value bin PVR(X) has the highest number of entries $PVR_C(X)$;
determining a stationary pixel value equal to the average value $PVR_A(X)$ of the pixel value bin PVR(X) with the highest number of entries; and
comparing pixel values in the first frame portion of subsequent image frames to the determined stationary pixel value and, if a difference therebetween is greater than a predetermined threshold value, identifying the corresponding pixel as a part of the moving object in the first frame portion of the sequence of image frames.

13. The system of claim 12, the method further comprising:
setting the predetermined threshold value as a function of a maximum pixel value and a minimum pixel value in the pixel value bin with the highest number of entries.

14. The system of claim 13, wherein setting the predetermined threshold value further comprises:
determining a maximum pixel value in the pixel value bin with the highest number of entries;
determining a minimum pixel value in the pixel value bin with the highest number of entries;
determining a first difference between the stationary pixel value and the maximum pixel value;
determining a second difference between the stationary pixel value and the minimum pixel value; and
setting the predetermined threshold value to a lesser of the first and second differences.

15. The system of claim 12, the method further comprising:
setting X=3; and
defining pixel value bins PVR(L), PVR(M) and PVR(H), each having a same width W, wherein a range RL of bin PVR(L)<a range RM of bin PVR(M)<a range RH of bin PVR(H),
wherein determining to which pixel value bin PVR(L), PVR(M) and PVR(H) the retrieved pixel value is to be added further comprises:
if the pixel value PV is in the range RM of the bin PVR(M) then setting $PVR_T(M)=PVR_T(M)+PV$ and setting the count $PVR_C(M)=PVR_C(M)+1$;
if the pixel value PV is greater than the range RM of the bin PVR(M) then setting $PVR_T(H)=PVR_T(H)+PV$ and setting the count $PVR_C(H)=PVR_C(H)+1$; and
if the pixel value PV is less than the range RM of the bin PVR(M) then setting $PVR_T(L)=PVR_T(L)+PV$ and setting $PVR_C(L)=PVR_C(L)+1$.

16. The system of claim 15, the method further comprising:
calculating an average value $PVR_A(M)=PVR_T(M)/PVR_C(M)$; and
setting the range RM of the bin PVR(M) such that $(PVR_A(M)-WL)$ RM $(PVR_A(M)+WU)$,
wherein WU+WL=W.

17. The system of claim 15, the method further comprising:
calculating a running average $PVR_A(M)=PVR_T(M)/PVR_C(M)$; and
setting the range RM of PVR(M) to $(PVR_A(M)\pm W/2)$.

18. The system of claim 12, the method further comprising:
setting a same width W for each pixel value bin PVR as a function of a chosen characteristic of the first frame portion of the sequence of image frames.

19. The system of claim 18, the method further comprising choosing the characteristic of the sequence of images from:
a wavelength of light recorded in the sequence of images;
a geographic location represented in the first frame portion of the sequence of images;
a time of day the sequence of images was recorded;
a date on which the sequence of images was recorded;
weather conditions at the location represented in the sequence of images; and
a type of equipment on which the sequence of images was recorded.

20. The system of claim 12, the method further comprising:
determining a dynamic range of the pixel values in the first frame portion of a first image frame of the sequence of images; and
setting a same width W for each pixel value bin PVR as a function of the determined dynamic range.

21. The system of claim 12, the method further comprising:
defining each bin PVR(X) having a respective range of values RV(X) wherein the ranges of values do not overlap.

22. The system of claim 21, wherein defining each bin PVR(X) further comprises:
if a number (j) of bins PVR(X) that have been populated with at least one entry is less than X, then comparing the retrieved pixel value PV to the ranges of the populated bins PVR(j) and creating a new bin PVR(j+

1) if the retrieved pixel value PV is not within a range of an already populated bin PVR(j).

23. A non-transitory computer readable media comprising instructions stored thereon that, when executed by a processing apparatus, cause the processing apparatus to implement a method of identifying a moving object with respect to a stationary portion of a sequence of image frames, the method comprising:
initializing a plurality X of pixel value bins PVR(X), each bin PVR(X) having an initial corresponding running total value $PVR_T(X)=0$ and an initial corresponding count of a number of entries $PVR_C(X)=0$; and
for each pixel in a first frame portion of each frame of a subset of image frames of the plurality of image frames:
retrieving the corresponding pixel value PV;
determining to which pixel value bin PVR(X) the retrieved pixel value PV is to be added; and
adding the retrieved pixel value PV to the running total $PVR_T(X)$ of the determined pixel value bin PVR(X) and incrementing the corresponding count of the number of entries $PVR_C(X)$ in the corresponding bin;
determining which pixel value bin PVR(X) has the highest number of entries $PVR_C(X)$;
determining a stationary pixel value equal to the average value $PVR_A(X)$ of the pixel value bin PVR(X) with the highest number of entries; and
comparing pixel values in the first frame portion of subsequent image frames to the determined stationary pixel value and, if a difference therebetween is greater than a predetermined threshold value, identifying the corresponding pixel as a part of the moving object in the first frame portion of the sequence of image frames.

24. The computer readable media of claim 23, the method further comprising:
setting the predetermined threshold value as a function of a maximum pixel value and a minimum pixel value in the pixel value bin with the highest number of entries.

25. The computer readable media of claim 24, wherein setting the predetermined threshold value further comprises:
determining a maximum pixel value in the pixel value bin with the highest number of entries;
determining a minimum pixel value in the pixel value bin with the highest number of entries;
determining a first difference between the stationary pixel value and the maximum pixel value;
determining a second difference between the stationary pixel value and the minimum pixel value; and
setting the predetermined threshold value to a lesser of the first and second differences.

26. The computer readable media of claim 23, further comprising:
setting X=3; and
defining pixel value bins PVR(L), PVR(M) and PVR(H), each having a same width W, wherein a range RL of bin PVR(L)<a range RM of bin PVR(M)<a range RH of bin PVR(H),
wherein determining to which pixel value bin PVR(L), PVR(M) and PVR(H) the retrieved pixel value is to be added further comprises:
if the pixel value PV is in the range RM of the bin PVR(M) then setting $PVR_T(M)=PVR_T(M)+PV$ and setting the count $PVR_C(M)=PVR_C(M)+1$;
if the pixel value PV is greater than the range RM of the bin PVR(M) then setting $PVR_T(H)=PVR_T(H)+PV$ and setting the count $PVR_C(H)=PVR_C(H)+1$; and
if the pixel value PV is less than the range RM of the bin PVR(M) then setting $PVR_T(L)=PVR_T(L)+PV$ and setting $PVR_C(L)=PVR_C(L)+1$.

27. The computer readable media of claim 26, further comprising:
calculating an average value $PVR_A(M)=PVR_T(M)/PVR_C(M)$; and
setting the range RM of the bin PVR(M) such that $(PVR_A(M)-WL) \le RM \le (PVR_A(M)+WU)$,
wherein WU+WL=W.

28. The computer readable media of claim 23, further comprising:
setting a same width W for each pixel value bin PVR as a function of a chosen characteristic of the first frame portion of the sequence of image frames.

29. The computer readable media of claim 28, further comprising choosing the characteristic of the sequence of images from:
a wavelength of light recorded in the sequence of images;
a geographic location represented in the first frame portion of the sequence of images;
a time of day the sequence of images was recorded;
a date on which the sequence of images was recorded;
weather conditions at the location represented in the sequence of images; and
a type of equipment on which the sequence of images was recorded.

30. The computer readable media of claim 23, further comprising:
determining a dynamic range of the pixel values in first frame portion of a first image frame of the sequence of images; and
setting a same width W for each pixel value bin PVR as a function of the determined dynamic range.

31. The computer readable media of claim 10, the method further comprising defining each bin PVR(X) wherein:
if a number (j) of bins PVR(X) that have been populated with at least one entry is less than X, then comparing the retrieved pixel value PV to the ranges of the populated bins PVR(j) and creating a new bin PVR(j+1) if the retrieved pixel value PV is not within a range of an already populated bin PVR(j).

* * * * *